(12) United States Patent
Belk

(10) Patent No.: US 8,424,756 B2
(45) Date of Patent: Apr. 23, 2013

(54) COMBINED BUSINESS/GIFT CARD WITH REDEMPTION NOTIFICATION

(75) Inventor: Andy Belk, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 208 days.

(21) Appl. No.: 12/944,485

(22) Filed: Nov. 11, 2010

(65) Prior Publication Data

US 2012/0118950 A1 May 17, 2012

(51) Int. Cl.
*G06K 5/00* (2006.01)
(52) U.S. Cl.
USPC .......................................................... 235/380
(58) Field of Classification Search .................. 235/380, 235/493, 375, 379; 705/39
See application file for complete search history.

(56) References Cited

U.S. PATENT DOCUMENTS

| | | |
|---|---|---|
| 6,493,970 B1 | 12/2002 | McCarthy et al. |
| 7,139,724 B1 | 11/2006 | Dworkin |
| 7,280,645 B1 * | 10/2007 | Allen et al. ................ 379/114.2 |
| 7,907,711 B2 * | 3/2011 | Nolan et al. ............. 379/114.15 |
| 8,046,268 B2 * | 10/2011 | Hunt ............................ 705/26.1 |
| 2006/0271391 A1 | 11/2006 | Lee |
| 2008/0301020 A1 | 12/2008 | Varakantam |
| 2009/0145969 A1 | 6/2009 | Daley |
| 2010/0100238 A1 | 4/2010 | Torian |

FOREIGN PATENT DOCUMENTS

WO WO 00/76780 12/2000

\* cited by examiner

*Primary Examiner* — Seung Lee
(74) *Attorney, Agent, or Firm* — Novak Druce Connolly Bove + Quigg LLP

(57) ABSTRACT

A calling card includes a gift code that can be used to redeem a gift online (e.g., songs, ring tones, coupons, physical merchandise) using an electronic communications device (e.g., a personal computer, mobile phone, electronic tablet). When a user attempts to redeem the gift online, the user can be provided with a web page, email, text message or other electronic document that provides the user with information about the card provider and allows the user to perform certain actions for the benefit of the card provider or a third party. The card provider can be electronically notified during or after an attempt by the user to redeem the gift online. The identity or other personal information of the user is not shared with the card provider unless the user volunteers to share such information.

20 Claims, 6 Drawing Sheets

Front Side

101a

Alice M. Smith
University Recruiting
Acme Inc.

Back Side

101b

For a free music download, go to http://www.musicstore.com, and enter the gift code below by following the instructions provided on our homepage:

WAKSTY4TEWP8 — 120

Expires: 12/1/2010

FIG. 1B

COMBINED BUSINESS/GIFT CARD WITH REDEMPTION NOTIFICATION

TECHNICAL FIELD

This disclosure relates generally to electronic marketing and content distribution.

BACKGROUND

A business card includes business information about a company or individual and is commonly shared during formal introductions. A business card typically includes the giver's name, company and contact information such as a street address, telephone number, fax number, e-mail address and website.

A gift card resembles a credit card and can be identified by a specific number or code, not usually with an individual name. Gift cards are often backed by an on-line electronic system for authorization. Some gift cards have a barcode or magnetic strip, which is read by an electronic credit card machine. Other gift cards can include a code that can be typed into an electronic device such as a computer or mobile phone for redemption of online content.

SUMMARY

A combined business card and gift card (hereinafter referred to as a "calling card") is a physical object that can be shared with others at business and social functions. The calling card can include a gift code that can be used to redeem a gift online (e.g., songs, ringtones, coupons, physical merchandise) using an electronic communications device (e.g., a personal computer, mobile phone, electronic tablet). When a user attempts to redeem the gift online, the user can be provided with a web page, email, text message or other electronic document that provides the user with information about the card provider and allows the user to perform certain actions for the benefit of the card provider or a third party. In some implementations, the information can be presented in a window or other display area generated locally by an operating system or application running on the electronic communications device.

In some implementations, the user is provided with information about the card provider or other third party and a means for optionally contacting the card provider or uploading personal information to the card provider, such as uploading a resume or entering information in a text field of a web page.

In some implementations, the card provider is electronically alerted during or after an attempt by the user to redeem the gift online. The alert message can include presenting the card provider with a web page, email, text message or other electronic document on an electronic communications device. In some implementations, the alert message can be presented in a window or other display area generated locally by an operating system or application running on the electronic communications device. The notification can provide information about the gift redemption (e.g., time, date, gift code, calling card number, expiration date). To protect the privacy of the user, the user's identity or other personal information are not shared with the card provider or a third party. In some implementations, however, the user may voluntarily provide personal information when redeeming the gift (e.g., resume) after receiving a privacy disclosure warning and voluntarily choosing to provide their personal information.

In some implementations, the gift code is compared to a reference database of gift codes that are associated with other information. For example, a gift code can be associated with one of a consecutive series of numbered calling cards that were purchased by or allocated to the card provider. The series of calling cards can be related to a particular event or location (e.g., a job fair, tradeshow, business meeting). Thus when the gift code is redeemed, the gift code can be matched to a unique calling card number, identifying the calling card as part of a series of calling cards known to have been distributed by the card provider at a particular event and/or location and/or at a particular date and time.

One or more implementations of a combined business/gift card with redemption notification can provide one or more of the following advantages: 1) a user is provided with incentive to use the system, 2) the user's identity and personal information are not shared with the card provider or any third party with authorization by the user, 3) the user is provided with a description of the card provider and the event where the card was received, 4) the user is provided with a convenient input mechanism to communicate with the card provider, 5) the card provider is provided with an automated alert message system which can be used as a reminder to follow-up with the user or other action items associated with an event, 6) the card provider is provided with a second opportunity to connect with the user through the optional input mechanism provided to the user, and 7) the card provider is provided with online administrative support services for managing the acquisition of calling cards and information generated by the gift redemption process.

The details of one or more of the disclosed implementations are set forth in the accompanying drawings and the description below. Other features, aspects, and advantages will become apparent from the description, the drawings, and the claims.

BRIEF DESCRIPTION OF THE DRAWINGS

FIG. 1B illustrates the front and back sides of a calling card with a calling card gift code.

Like reference symbols in the various drawings indicate like elements.

DETAILED DESCRIPTION

Exemplary System

Figure 1A:
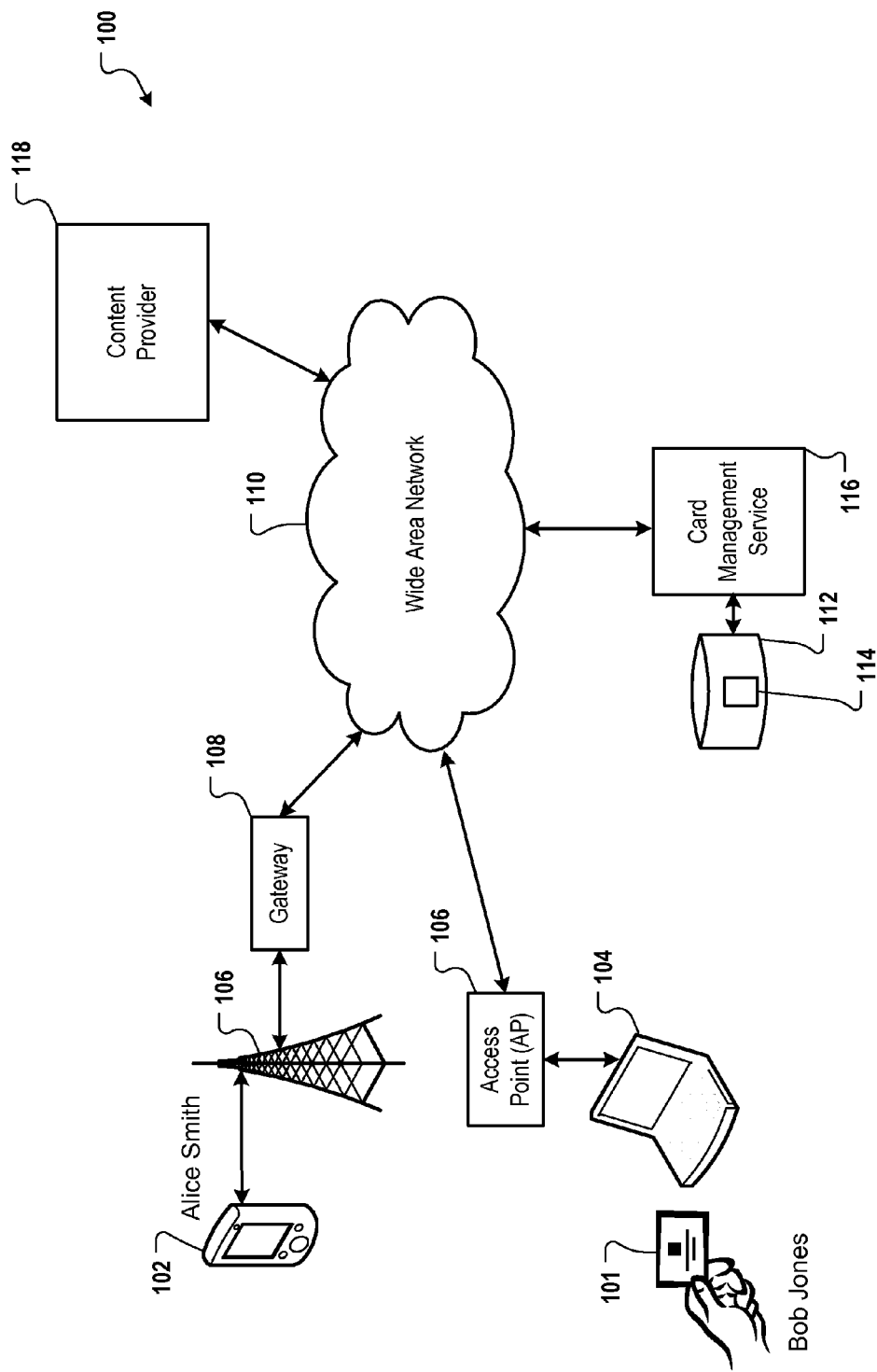
FIG. 1A is a block diagram of an exemplary system for notifying a card provider of a gift redemption associated with a calling card.

FIG. 1A is a block diagram of an exemplary system for notifying a card provider of a gift redemption associated with a calling card. In some implementations, system 100 can include electronic communications devices 102, 104, content provider 118 and card management service 116. A first device 102 can be a mobile device that can couple to wide area network 110 (e.g., Internet) through transmitter 106 (e.g., a cell tower transmitter) and gateway 108. A second device 104 can couple to network 110 through access point (AP) 106 (e.g., a wireless router, hub or modem). Devices 102, 104 can be any electronic communications device capable of receiving information through a wired or wireless communication link, including but not limited to: personal computers, smart phones, electronic tablets, email devices, Internet television systems, etc.

Card management service (CMS) 116 can couple to network 110 and can include one or more server computers coupled to database 112. Database 112 can store various information associated with system 100. Database can be one or more databases. In some implementations, CMS 116 can be an online service provider that provides calling card management services. In some implementations, CMS 116 can provide other services, such as an Internet Service Provider (ISP) or Application Service Provider (ASP). CMS 116 can include a web server that provides administrative user interfaces for users to sign up for calling card management services or to manage their accounts.

Content provider 118 can be any online provider of digital media items, including but not limited to: a retail store where users can download music, videos, ringtones, podcasts, ebooks or any other digital content. Content provider 118 and card management service 116 can be operated by the same entity and co-located in the same facility.

Exemplary Use Scenario-University Recruiting

The operation of system 100 will now be described through an example use case related to university recruiting. Other use cases for system 100 are also possible, including use cases related to sales or marketing or any other scenario where business cards or gift cards are distributed.

Alice M. Smith is a college recruiter for Acme Inc. She is attending a job fair at MIT in Cambridge, Mass. on Sep. 1, 2010. Before going to the event, Alice contacts CMS 116 and requests calling cards for the event. In some implementations, the request can be made through a web page of an online website operated by or on behalf of CMS 116. Alice receives a box of calling cards from CMS 116, the box is labeled with a code that identifies the box and a consecutively numbered or otherwise ordered series of calling cards in a defined range. For example, the box could include 100 calling cards consecutively numbered from 300-400.

Alice attends the job fair and starts handing out the calling cards to prospective students. In some cases, she may receive resumes from the students. She also takes notes about the students she meets. In this example, she meets a student named Bob Jones. Bob does not have a resume but expresses interest in working for Acme. Alice hands Bob calling card 101. The front side 101a of calling card 101 includes her business information, as shown in FIG. 1B. The backside 101b of calling card 101 includes gift code 120, expiration date and instructions for redeeming a free gift at a website of content provider 118. In this example, content provider 118 is the fictitious "MusicStore.com" and the free gift is a song download. Other types of content can be provided and may not be offered for free depending on the use scenario.

Calling card 101 is one example format for a calling card. Other formats are also possible, such as cards having a magnetic strip or barcode as a carrier for the gift code. Calling cards can be made of any desirable material, such as paper or plastic. In some implementations, objects other than cards can be used to carry gift codes, such as small toys, novelty items, pens or any other marketing item that is typically provided at social or business events.

After the event, Bob enters gift code 120 into device 104, which in this example is his notebook computer. Per the instructions on calling card 101, Bob uses his browser to access the homepage of the MusicStore.com website. Bob follows the instructions on a home page, which can include entering gift code 120 into an input field. Before the free song is downloaded, Bob is presented with a user interface 200, as described in reference to FIG. 2.

Exemplary User Interfaces

Figure 2:
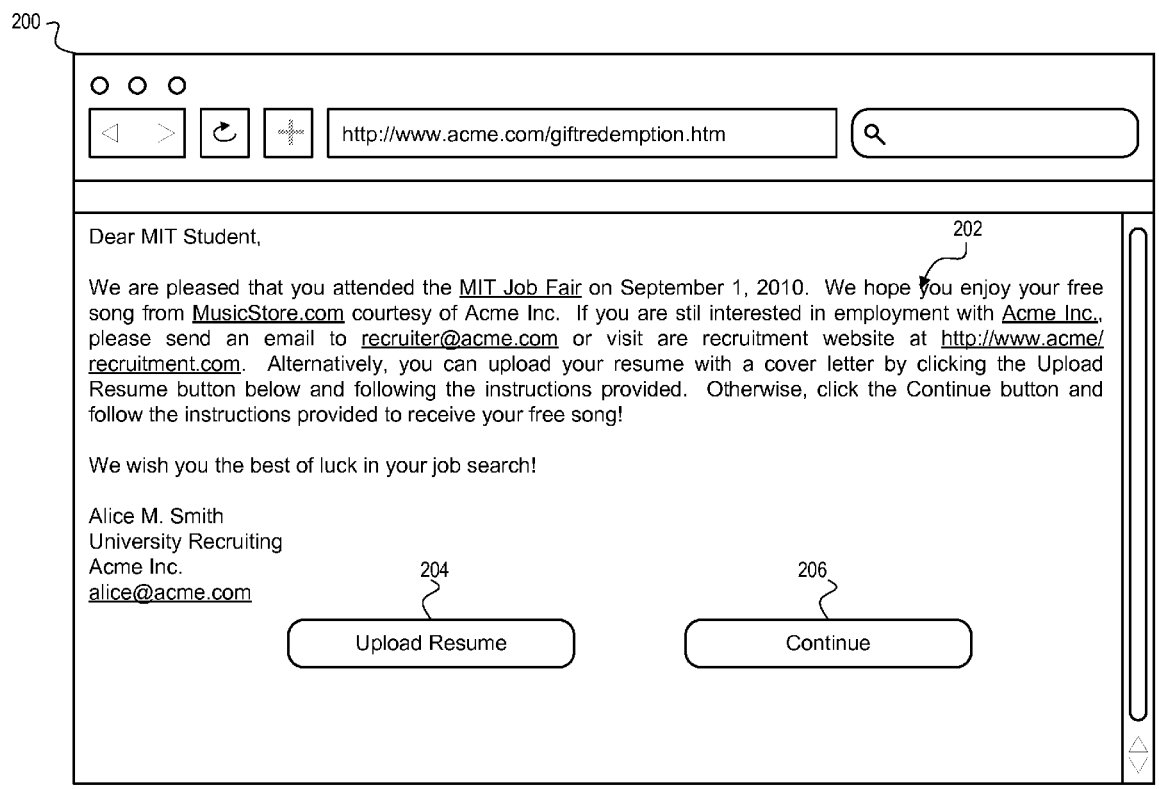
FIG. 2 illustrates an exemplary user interface provided to a user who redeems a gift using a calling card gift code.

FIG. 2 illustrates an exemplary user interface 200 provided to a user (Bob in this example) who redeems a gift using gift code 120. User interface 200 can be a web page served by content provider 118 or CMS 116 or any other electronic document that can present information on an electronic communications device. In some implementations, entering the gift code results in a redirection of the user' browser to a Uniform Resource Locator (URL) of a website operated by CMS 116. Information 202 is presented to Bob on user interface 200 which is related to the MIT Job Fair on Sep. 1, 2010. The information can be populated with links to Acme and third party emails and websites. In the example shown, an email link (recruiter@acme.com) is provided on user interface 200 to allow Bob to send an email to Acme recruiting department. There is also a link to the Acme recruiting website (http://www.acme/recruitment), a link to the homepage of the MusicStore.com website and a link to Alice's private email account.

At the bottom of user interface 200, a user interface element 204 (e.g., a button) invokes an input mechanism for uploading a resume to the Acme recruiting department. A user interface element 206 (e.g., a button) allows Bob to continue to a song download page, where Bob can download his free song.

An advantage of user interface 200 is that Bob remains anonymous during the redemption process. No personal information is transferred to Acme or a third party. Bob is reminded of where he received the calling card and invited to submit a resume. This provides Bob with control over the dissemination of his personal information. During the foregoing process, or after the process has completed, Alice is sent an alert message as described in reference to FIG. 3.

In this example, user interface 200 was a web page. Other modes of communication are also possible, including but not limited to email and text message communication. For example, if Bob provided Alice with contact information, then when Bob redeems his gift Bob could receive an email with information from recruiter@acme.com. Bob could then, at his option, attach his resume to a return email. The link http://www.acme/recruitment can also be included in the email or a text message. Bob could also receive a text message or telephone call with a recorded message if Bob shared his telephone number with Alice.

Figure 3:
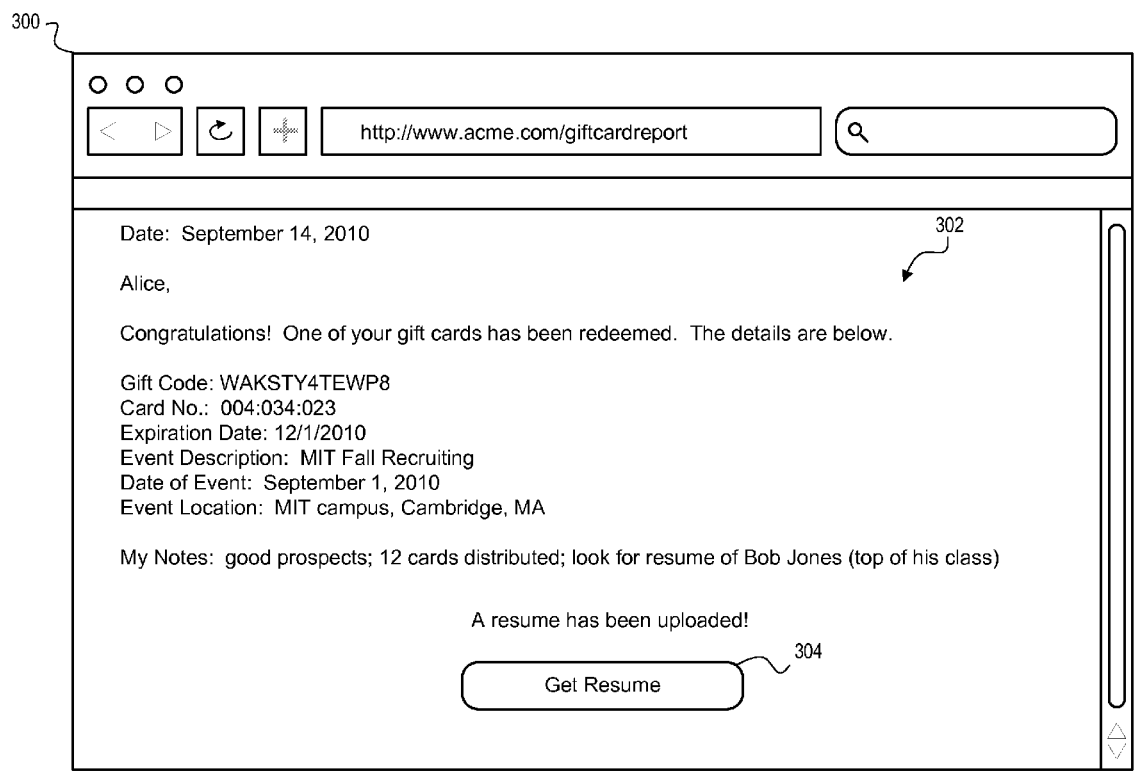
FIG. 3 illustrates an exemplary user interface provided to card provider associated with the calling card for providing the card provider with gift redemption alert message message.

FIG. 3 illustrates an exemplary user interface 300 provided to card provider (Alice) associated with calling card 101 for providing the card provider with a gift redemption alert message. Gift code 120 entered on device 104 can be transmitted to CMS 116 through AP 106 and network 110. CMS 116 can compare the code to record 114 in database 112 to identify calling card number 101 and the card provider. Below is an exemplary database record 114 of database 112 that can be used to associate a gift code with other relevant information.

Exemplary Database Record

| Gift Code | Card Number | Owner | Event | Notes |
| --- | --- | --- | --- | --- |
| WAKSTY4TEWP8 | 004034023 | Alice M. Smith | MIT Job Fair 2010 | Good turn out; distributed 30 cards; look for Bob Jones resume-top of his class! |

The exemplary database record 114 includes 5 fields: Gift Code, Card Number, Owner, Event and Notes. The first field stores gift code 120 which was obtained from calling card 101. The second field stores a number assigned to calling card 101. In some implementations, the number can be a unique number in a set of calling cards. In some implementations, the set of calling cards can be an ordered sequence of calling cards based on calling card numbers. The card number shown in this example can be broken into three 3-digit sections: box number, series number, card number. Thus, the card number 004:034:023 defines box number: 4, series number: 34 and card number: 23. Other numbering schemes are also possible. This numbering scheme allows boxes of cards to be assigned to owners, and consecutive series of cards within the box can be assigned to individual employees. In this example, box 4 was assigned to Acme Inc., a consecutive series of cards 34 were assigned to Alice M. Smith, and card 23 in series 34 was redeemed by Bob.

The third field in record 114 can store the name of the card provider and any other desired information. The fourth field in record 114 stores a description of the event where the cards were distributed by Alice. The fifth field stores notes from Alice regarding the event. In some implementations, record 114 can be reviewed and edited by Alice online through an administrative page of a website operated by CMS 116. After Alice distributes her cards at the MIT Job Fair, Alice can logon to the CMS website and fill in the third, fourth and fifth fields of record 114.

In some implementations, the card number can be the same as the gift code. Having a gift code and card number allows a third party to provide the gift codes. For example, MusicStore.com can provide CMS 116 with a list of gift codes, which can then be applied to calling cards. For example, the codes can be printed on adhesive stickers and placed on business cards.

Referring again to FIG. 3, user interface 300 provides information 302. Information 302 can include a gift code, a card number, an expiration date, an event description, a date of the event and the event location. Information 302 can be retrieved from record 114. Information 302 can also include user interface element 304 for excepting data from a user. In the example shown, a "Get Resume" button can be used by Alice to retrieve Bob's resume, if provided by Bob. If Bob previously provided Alice with personal information, then that information can also be displayed in user interface 300. For example, if Alice new that Bob was the student who received the card identified in record 114, then information 202 in user interface 200 could have been tailored to Bob rather than a generic "MIT Student."

In some implementations, event location information can be provided by a location aware device at the event the location. For example, Alice's device 102 (e.g., a mobile phone with GPS), could send position coordinates to CMS 116, which can convert the position coordinates to a map location. The map location can then be added to, for example, a sixth field in record 114.

Exemplary Process

Figure 4:
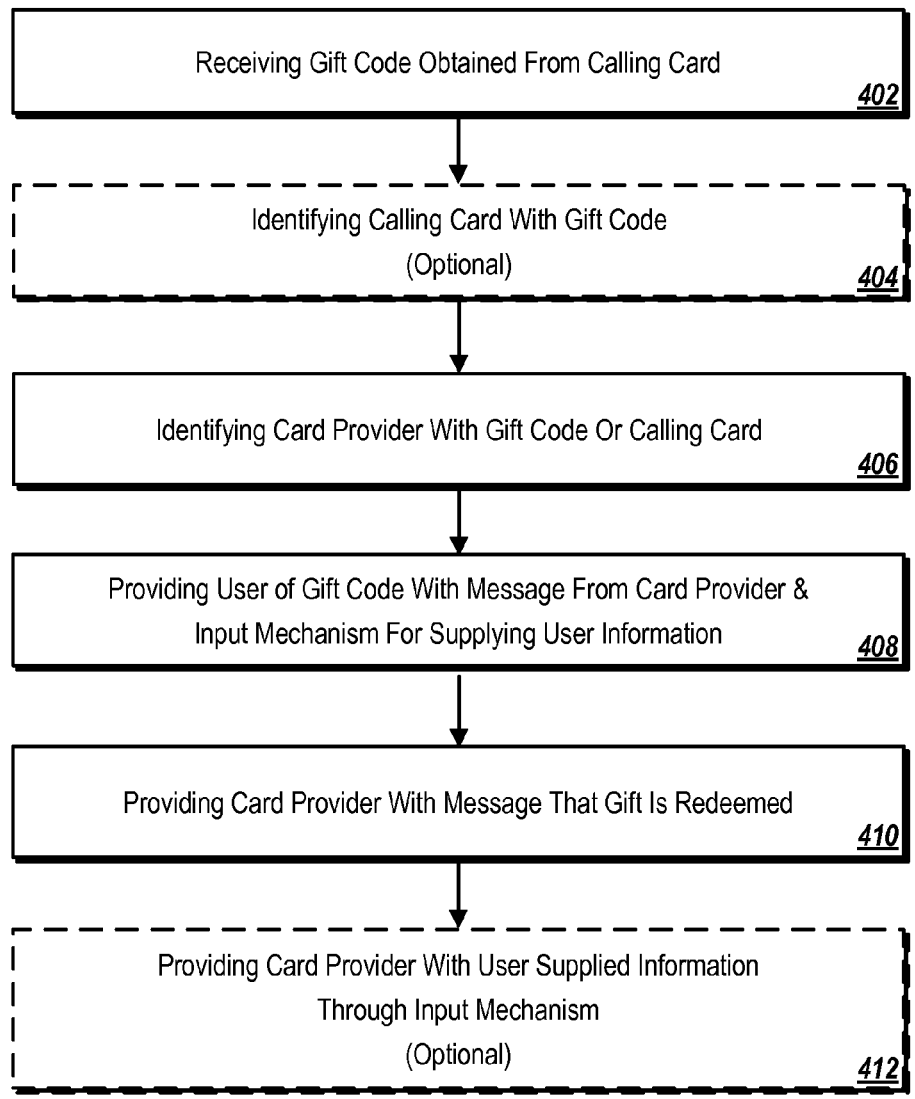
FIG. 4 is a flow diagram of an exemplary process for alerting a card provider of a gift redemption associated with a calling card distributed by the card provider.

FIG. 4 is a flow diagram of an exemplary process 400 for alerting a card provider of a gift redemption associated with a calling card distributed by the card provider. Process 400 will be described with reference to system 100, which implements process 400.

In some implementations, process 400 can begin by receiving a gift code obtained from a physical calling card (402). The gift code can be printed on the calling card or encoded in a barcode or magnetic strip on the calling card. The gift code can be received from an electronic communications device operated by a user who is in possession of the calling card. The user can type or scan the gift code into the device and the device can send the gift code to CMS 116 over network 110. In some implementations, if the device has a camera, the user can take a picture of the gift code, which can be transmitted to CMS 116, where image processing software can extract the gift code from the image. Bar codes can be similarly processed if a conventional bar code scanner is not available. In some implementations, the calling card can include a wireless transceiver so that it can communicate directly with another device through a wireless communication link.

Process 400 can proceed with an optional step of identifying a calling card using the gift code (404). In some implementations, the gift code can be related to a calling card number using a relational database. When the gift code is received it can be matched to a calling card number stored in the database.

Process 400 can proceed by identifying a card provider using the gift code or the calling card (406). In some implementations, the gift code and/or the matching calling card number can be matched to a card provider description stored in the relational database.

Process 400 can proceed by providing the user of the gift code with a message from the card provider and an input mechanism for supplying personal information to the card provider (408). An exemplary user interface for providing the message and input mechanism was described in reference to FIG. 2.

Process 400 can proceed by sending an alert message to the card provider stating that the gift is redeemed (410). In some implementations, the identify or other personal information of the user is not provided in the alert message. The alert message can be sent by any mode of communication, including but not limited to: email, text messaging and web pages. The alert message can include information associated with an event where the card was distributed. An exemplary user interface for providing the alert message was described in reference to FIG. 3.

Process 400 can proceed by presenting the card provider with user information supplied through the input mechanism (412). In some implementations, the input mechanism can be a link for starting a dialog that instructs the user on how to upload their resume or other information to CMS 116.

Exemplary Device Architecture

Figure 5:
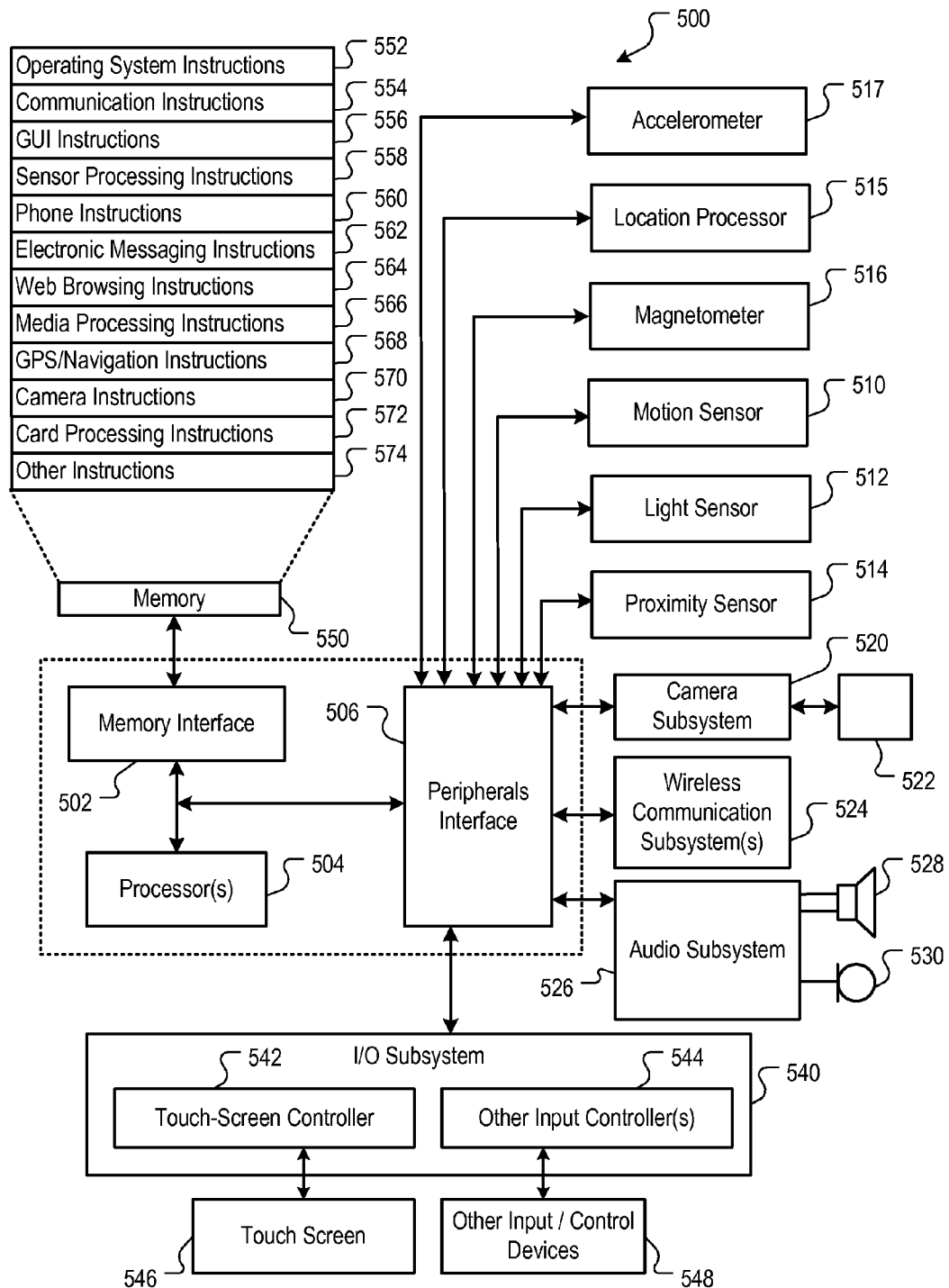
FIG. 5 is a block diagram of exemplary hardware architecture for the devices described in reference to FIGS. 1-4.

FIG. 5 is a block diagram of exemplary hardware architecture for mobile devices 102, 104 described in reference to FIGS. 1-4. Mobile devices 102, 104 can be, for example, mobile phones with web browsing, text messaging and email capabilities. The mobile devices 102, 104 can include memory interface 502, one or more data processors, image processors and/or processors 504, and peripherals interface 506. Memory interface 502, one or more processors 504 and/or peripherals interface 506 can be separate components or can be integrated in one or more integrated circuits. The various components in the device, for example, can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the mobile device. Location processor 515 (e.g., GPS receiver) can be connected to peripherals interface 506 to provide geopositioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass. Accelerometer 517 can also be connected to peripherals interface 506 to provide data that can be used to determine change of speed and direction of movement of the mobile device.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which a mobile device is intended to operate. For example, a mobile device can include communication subsystems 524 designed to operate over a GSM network, a GPRS network, an EDGE network, a WiFi or WiMax network, and a Bluetooth network. In particular, the wireless communication subsystems 524 can include hosting protocols such that the mobile device can be configured as a base station for other wireless devices.

Audio subsystem 526 can be coupled to a speaker 528 and a microphone 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to a touch screen 546 or pad. Touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In one implementation, a pressing of the button for a first duration may disengage a lock of the touch screen 546; and a pressing of the button for a second duration that is longer than the first duration may turn power to the device on or off. The user may be able to customize a functionality of one or more of the buttons. The touch screen 546 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing, such as the user interfaces illustrated in FIGS. 2 and 3; sensor processing instructions 558 to facilitate sensor-related processing and functions; phone instructions 560 to facilitate phone-related processes and functions; electronic messaging instructions 562 to facilitate electronic-messaging related processes and functions, such as SMS and MMS; web browsing instructions 564 to facilitate web browsing-related processes and functions; media processing instructions 566 to facilitate media processing-related processes and functions; GPS/Navigation instructions 568 to facilitate GPS and navigation-related processes and instructions; and camera instructions 570 to facilitate camera-related processes and functions. The memory 550 may also store other software instructions (not shown), such as security instructions, web video instructions to facilitate web video-related processes and functions, and/or web shopping instructions to facilitate web shopping-related processes and functions.

Memory 550 can include instructions for a client-side application that facilitates interaction with servers operated by CMS 116 and content provider 118. Other instructions 574 can include instructions for other applications not expressly described herein.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    storing a record in a database, the record relating to a physical card and identifying a card provider and a gift code;
    receiving a code from a card recipient for redeeming a gift over a communications network, where the code was obtained by the card recipient from the physical card associated with the card provider;
    identifying, upon redemption of the gift, the card provider with the gift code by accessing the database and referencing the record;
    causing a first user interface to be displayed on a first device for sending the gift code over the communications network, the first user interface including information related to the card provider; and
    alerting the card provider that the gift is redeemed without identifying the card recipient to the card provider, where the method is performed by one or more computer processors.

2. The method of claim 1, where causing a first user interface to be displayed on the first device, further comprises:
    causing a web page to be served to a browser running on the first device; and
    providing the information on the web page.

3. The method of claim 1, where causing a first user interface to be displayed on the first device, further comprises:
    causing an input mechanism for uploading a document to be included in the first user interface;
    receiving an uploaded document in response to the card recipient operating the input mechanism; and
    sending the document to the card provider or a third party.

4. The method of claim 1, where alerting the card provider that the gift is redeemed, further comprises:
    causing a second user interface to be displayed on a second device, the second user interface including information about the gift redemption.

5. The method of claim 4, wherein the record identifies an event, the method further comprising:
    identifying an event associated with a distribution of the card to the card recipient by accessing the database and referencing the record.

6. The method of claim 1, wherein the record identifies the physical cards association with a set of cards, and wherein identifying the card provider further comprises:
determining that the card is part of a set of cards by accessing the database and referencing the record.

7. The method of claim 1, further comprising:
determining that the code is expired; and
alerting the user that the code is expired.

8. The method of claim 1, where alerting the card provider, further comprises:
sending an email or text message to the card provider or a third party.

9. The method of claim 8, where the email address or text message number is associated with an event where the card was distributed to the card recipient.

10. The method of claim 1, where identifying the card provider with the gift code, further comprises:
identifying the physical card with the gift code by accessing the database and referencing the record; and
identifying the card provider with the card.

11. A system comprising:
one or more processors;
memory coupled to the one or more processors and storing instructions, which, when executed by the one or more processors, causes the processors to perform operations comprising:
storing a record in a database, the record relating to a physical card and identifying a card provider and a gift code
receiving a code from a card recipient for redeeming a gift over a communications network, where the code was obtained by the card recipient from the physical card associated with the card provider;
identifying, upon redemption of the gift, the card provider with the gift code by accessing the database and referencing the record;
causing a first user interface to be displayed on a first device for sending the gift code over the communications network, the first user interface including information related to the card provider; and
alerting the card provider that the gift is redeemed without identifying the card recipient to the card provider.

12. The system of claim 11, where the instructions, when executed by the one or more processors, causes the one or more processors to perform operations, comprising:
causing a web page to be served to a browser running on the first device; and
providing the information on the web page.

13. The system of claim 11, where the instructions, when executed by the one or more processors, causes the one or more processors to perform operations, comprising:
causing an input mechanism for uploading a document to be included in the first user interface;
receiving an uploaded document in response to the card recipient operating the input mechanism; and
sending the document to the card provider or a third party.

14. The system of claim 11, where the instructions, when executed by the one or more processors, causes the one or more processors to perform operations, comprising:
causing a second user interface to be displayed on a second device, the second user interface including information about the gift redemption.

15. The system of claim 14, wherein the record identifies an event, where the instructions, when executed by the one or more processors, causes the one or more processors to perform operations, comprising:
identifying an event associated with a distribution of the card to the card recipient by accessing the database and referencing the record.

16. The system of claim 11, wherein the record identifies the physical cards association with a set of cards, and where the instructions, when executed by the one or more processors, causes the one or more processors to perform operations, comprising:
determining that the card is part of a set of cards by accessing the database and referencing the record.

17. The system of claim 11, where the instructions, when executed by the one or more processors, causes the one or more processors to perform operations, comprising:
determining that the code is expired; and
alerting the user that the code is expired.

18. The system of claim 11, where the instructions, when executed by the one or more processors, causes the one or more processors to perform operations, comprising:
sending an email or text message to the card provider or a third party.

19. The system of claim 18, where the email address or text message number is associated with an event where the card was distributed to the card recipient.

20. The system of claim 11, where the instructions, when executed by the one or more processors, causes the one or more processors to perform operations, comprising:
identifying the physical card with the gift code by accessing the database and referencing the record; and
identifying the card provider with the card.

* * * * *